US009237529B2

(12) United States Patent
Dahrouj et al.

(10) Patent No.: US 9,237,529 B2
(45) Date of Patent: Jan. 12, 2016

(54) METHOD AND APPARATUS FOR MANAGING INTERFERENCE IN WIRELESS BACKHAUL NETWORKS THROUGH POWER CONTROL WITH A ONE-POWER-ZONE CONSTRAINT

(71) Applicants: Hayssam Dahrouj, Toronto (CA); Wei Yu, Toronto (CA); Taiwen Tang, Ottawa (CA); Jerry Chow, San Diego (CA); Radu Selea, Vaughan (CA)

(72) Inventors: Hayssam Dahrouj, Toronto (CA); Wei Yu, Toronto (CA); Taiwen Tang, Ottawa (CA); Jerry Chow, San Diego (CA); Radu Selea, Vaughan (CA)

(73) Assignee: BLINQ Wireless Inc., Ottawa, Ontario ( * ) Notice: Subject to any disclaimer, the term of this patent is extended or adjusted under 35 U.S.C. 154(b) by 385 days.

(21) Appl. No.: 13/852,765

(22) Filed: Mar. 28, 2013

(65) Prior Publication Data
US 2013/0260817 A1    Oct. 3, 2013

Related U.S. Application Data

(60) Provisional application No. 61/617,670, filed on Mar. 30, 2012.

(51) Int. Cl.
| | |
|---|---|
| *H04B 7/00* | (2006.01) |
| *H04W 52/24* | (2009.01) |
| *H04W 52/34* | (2009.01) |

(52) U.S. Cl.
CPC ............ *H04W 52/24* (2013.01); *H04W 52/346* (2013.01)

(58) Field of Classification Search
CPC .................................................. H04W 52/244
USPC .................. 455/522, 452.1, 452.2, 453, 63.1, 455/67.11; 370/328, 329, 330
See application file for complete search history.

(56) References Cited

U.S. PATENT DOCUMENTS

| | | | |
|---|---|---|---|
| 5,956,642 | A | 9/1999 | Larsson et al. |
| 7,729,257 | B2 | 6/2010 | Kodialam et al. |

(Continued)

FOREIGN PATENT DOCUMENTS

| | | |
|---|---|---|
| CA | 2809721 | 3/2012 |
| WO | 96/31009 | 10/1996 |

(Continued)

OTHER PUBLICATIONS

S. G. Kiani and D. Gesbert, entitled "Optimal and Distributed Scheduling for Multicell Capacity Maximization" IEEE Trans. Wireless Commun., vol. 7, No. 1, pp. 288-297, Jan. 2008.

(Continued)

*Primary Examiner* — Sanh Phu
(74) *Attorney, Agent, or Firm* — Ridout & Maybee LLP

(57) ABSTRACT

Methods and apparatus are provided for managing interference in a wireless backhaul network comprising a plurality of hubs, each hub serving a plurality of remote backhaul modules (RBM), using power control with a one-power-zone (OPZ) constraint. Each hub uses a transmit frame structure comprising a plurality of zones, each RBM is scheduled on a different zone, and the same power level is maintained across all zones within a transmit frame. Under the OPZ constraint, and for scheduling policies under which the number of zones assigned to each RBM is fixed, the power and scheduling sub-problems are decoupled. This enables power control independent of scheduling, using methods having lower computational complexity. Methods are disclosed comprising iterative function evaluation or Newton's method approaches based on a weighted sum-rate maximization across the network, which can be implemented in a distributed fashion. Some of the methods can be implemented asynchronously at each hub.

20 Claims, 9 Drawing Sheets

(56) References Cited

U.S. PATENT DOCUMENTS

| | | | |
|---|---|---|---|
| 7,826,417 | B2 | 11/2010 | Yang et al. |
| 8,260,207 | B2 * | 9/2012 | Srinivasan et al. ............ 455/63.1 |
| 8,462,646 | B2 * | 6/2013 | Barberis et al. ............... 370/252 |
| 8,463,272 | B2 * | 6/2013 | Yamamoto et al. ........... 455/438 |
| 2004/0087327 | A1 | 5/2004 | Guo |
| 2009/0197603 | A1 | 8/2009 | Ji et al. |
| 2010/0009748 | A1 | 1/2010 | Timperley |
| 2010/0087149 | A1 | 4/2010 | Srinivasan et al. |
| 2010/0097948 | A1 | 4/2010 | Barberis |
| 2010/0159841 | A1 | 6/2010 | Barberis et al. |
| 2010/0254344 | A1 * | 10/2010 | Wei et al. ...................... 370/330 |
| 2011/0111766 | A1 * | 5/2011 | Yang et al. ................. 455/452.2 |
| 2011/0222455 | A1 | 9/2011 | Hou et al. |
| 2012/0133557 | A1 | 5/2012 | Beaudin |
| 2012/0236731 | A1 | 9/2012 | Beaudin |
| 2012/0281648 | A1 | 11/2012 | Dahrouj et al. |

FOREIGN PATENT DOCUMENTS

| | | |
|---|---|---|
| WO | 2005/101882 | 10/2005 |
| WO | 2008/033369 | 3/2008 |
| WO | 2008/096383 | 8/2008 |
| WO | 2009/066986 | 5/2009 |
| WO | 2009/119463 | 10/2009 |
| WO | 2010/003509 | 1/2010 |
| WO | 2010/013245 | 2/2010 |
| WO | 2011/037319 | 3/2011 |
| WO | 2012/037643 | 6/2012 |
| WO | 2013/000068 | 2/2013 |

OTHER PUBLICATIONS

L. Venturino, N. Prasad, and X, Wang, entitled "Coordinated Scheduling and Power Allocation in Downlink Multicell OFDMA Networks," IEEE Trans. Veh. Technol., vol. 6, No. 58, pp. 2835-2848, Jul. 2009.

A. L. Stolyar and H Viswanathan, entitled "Self-Organizing Dynamic Fractional Frequency Reuse for Best-Effort Traffic Through Distributed Intercell Coordination," in INFOCOM, Apr. 2009.

M. X. Gong, et al., "Load-and Interference-Aware Channel Assignment for Dual-Radio Mesh Backhaul", 2008 IEEE Global Telecommunications Conference (IEEE GLOBECOM 2008), pp. 1-6, Nov. 30-Dec. 4, 2008.

H. Dahrouj, W, Yu. T. Tang, J. Chow and R. Selea, "Coordinated scheduling for wireless backhaul network with soft frequency reuse", in 21st European Signal Processing Conference (EUSIPCO), Marrakech, Morocco. Sep. 2013 (invited paper).

H. Dahrouj et al, "Interference Mitigation Via Power Control Under the One-Power-Zone Constraint", IEEE Global Telecommun. Conf. (Globecom), Anaheim, CA, USA, Dec. 2012.

D. P. Bertsekas, in "The auction algorithm: A distributed relaxation method for the assignment problem," Annals of Operations Research, vol. 14, pp. 105-123, Dec. 1988.

* cited by examiner

Schematic representation of wireless backhaul network comprising 7 hubs, each hub serving 4 RBMs Frame structure of two interfering hubs *l* and *j*, illustrating the one-power-zone constraint

| | |
|---|---|
| Cellular Layout | Hexagonal |
| Number of Hubs | 7 |
| Frequency Reuse | 1 |
| Number of RBMs per hub | 4 |
| Number of Zones per Frame | 4 |
| Scheduling | Round-robin |
| Weights $\lambda_{lk}$ | 1 |
| Hub-to-Hub Distance | $d_1$ |
| Hub-to-RBM Distance | $d_2$ |
| Duplex | TDD |
| Channel Bandwidth | 10 MHz |
| Hub Max Tx Power Per Subcarrier | -32.70 dBw |
| SINR Gap | 12 dB |
| Total Noise Power Per Subcarrier | -158.61 dBw |
| Distance-dependent Path Loss | $128.1 + 37.6 \log_{10}(d)$ |
| Sampling Frequency | 11.2 MHz |

FIG. 4

A. Sum-rate comparison for different cell size $d_1$

| Sum Rate (bps/Hz) | Small-cell ($d_1 = 0.5$km) | Large-cell ($d_1 = 1$km) |
|---|---|---|
| Full-IFEM | 61.46 | 93.07 |
| OPZ-IFEM | 58.06 | 88.85 |
| OPZ-AVG-IFEM | 56.18 | 87.80 |
| Max Power | 53.0 | 86.30 |
| OPZ-IFEM Gain | 9.6% | 3.0% |
| Full-IFEM Gain | 16.0% | 7.8% |

B. Hub-to-hub distance 0.5km.

| Sum Rate (bps/Hz) | Cell-edge ($d_2 = 333$m) | Cell-center ($d_2 = 125$m) |
|---|---|---|
| Full-IFEM | 41.60 | 78.22 |
| OPZ-IFEM | 34.84 | 75.53 |
| OPZ-AVG-IFEM | 32.38 | 74.95 |
| Max Power | 30.82 | 71.85 |
| OPZ-IFEM Gain | 13.0% | 5.1% |
| Full-IFEM Gain | 35.0% | 8.9% |

C. Hub-to-hub distance 1km.

| Sum Rate (bps/Hz) | Cell-edge ($d_2 = 667$m) | Cell-center ($d_2 = 250$m) |
|---|---|---|
| Full-IFEM | 45.31 | 84.48 |
| OPZ-IFEM | 43.77 | 82.63 |
| OPZ-AVG-IFEM | 43.02 | 82.21 |
| Max Power | 41.45 | 80.24 |
| OPZ-IFEM Gain | 5.6% | 3.0% |
| Full-IFEM Gain | 9.3% | 5.3% |

FIG. 5

Sum rate comparison for difference channel realizations

Convergence speed for OPZ Newton's Method compared with other methods

METHOD AND APPARATUS FOR MANAGING INTERFERENCE IN WIRELESS BACKHAUL NETWORKS THROUGH POWER CONTROL WITH A ONE-POWER-ZONE CONSTRAINT

CROSS-REFERENCE TO RELATED APPLICATIONS

This application claims priority from U.S. Provisional application No. 61/617,670, entitled "Method and Apparatus for Mitigating Wireless Interference Via Power Control with One-Power-Zone Constraints", filed Mar. 30, 2012, by the present inventors, which is incorporated herein by reference. This application is related to U.S. patent application Ser. No. 13/463,478, entitled "Interference Mitigation with Scheduling and Dynamic Power Spectrum Allocation for Wireless Networks", filed May 3, 2012, which claims priority from U.S. provisional patent application No. 61/506,895, entitled "Interference Mitigation with Scheduling and Dynamic Power Spectrum Allocation for Wireless Networks", filed Jul. 12, 2011 and U.S. Provisional patent application No. 61/483,417, entitled "Interference Mitigation With Scheduling And Mara-Based Dynamic Power Spectrum Allocation For [NLOS] Wireless Backhaul Networks", filed May 6, 2011, the entire contents of which are incorporated herein by reference.

TECHNICAL FIELD

The present invention relates to wireless backhaul networks for high-capacity data networks, and to systems and methods for managing and mitigating interference through power control. It especially relates to power control for wireless backhaul networks comprising MicroCell and PicoCell networks.

BACKGROUND

Interference mitigation is a key challenge in improving the capacity of future wireless networks. In a densely deployed and interference-limited network, an effective way to mitigate interference is through power control. The successful implementation of power control is, however, also dependent on its algorithmic complexity, the hardware limitations of the wireless front-end, and especially the ability to integrate power control with system-level operations such as scheduling.

The use of power control for interference mitigation is of particular interest for wireless backhaul networks, which are deployed as a means to increase the network throughput for areas with high data traffic demand.

Interference mitigation is a particular consideration in the development of next-generation wireless backhaul products for compact base-stations, and Non Line of Sight (NLOS)-type backhaul networks, for example. NLOS backhaul technology provides a cost-effective approach for increasing the cell site capacity of PicoCell and MicroCell deployments. In a system of this type, a cellular network may comprise several PicoCells, each covering a relatively small area, as a means to increase the network capacity for areas with dense data traffic. The users within each PicoCell are served by their own PicoCell base-station, also called access modules (AM). The AMs are co-located with the remote backhaul modules (RBM) of the backhaul network. Each RBM is connected to a hub via wireless backhaul radio links. These radio links provide an alternative to expensive optical fiber links. Each hub serves multiple RBMs. The hubs are responsible for the transmission strategies and radio resource management for the different RBMs. Unlike the classical relay problem, the backhaul architecture assumes that the wireless backhaul links and the access links operate at different frequencies. From a backhaul design perspective, the interest is therefore in mitigating the interhub interference, thereby maximizing the aggregate data capacity of the RBMs and the backhaul network.

Typically, conventional wireless backhaul networks operate using a maximum power transmission strategy. However, it is desirable to be able to optimally adjust the power level of the radio transmitters with the goal of reducing undesirable interference. This power control problem has been extensively studied in the literature.

In general, power allocation is inherently coupled with scheduling. Thus, the optimization of the overall system performance requires a joint power control and scheduling. Existing efforts in the literature often involve either an exhaustive search, for small networks, or local iterative optimization of scheduling and power control, for which convergence and complexity may be issues for practical implementation. An iterative approach to joint power control and scheduling is disclosed, for example, in [1] the above referenced, related co-pending U.S. patent application Ser. No. 13/463,478, entitled "Interference Mitigation with Scheduling and Dynamic Power Spectrum Allocation for Wireless Networks" by Dahrouj et al., and in [2] PCT patent publication No. WO/2011/037319, published Mar. 31, 2011, by T. Kwon et al., entitled "Method and Device for User Scheduling and Managing Transmit Power in a Communication System".

Other references that discuss scheduling and power control include: [3] S. G. Kiani and D. Gesbert, entitled "Optimal and Distributed Scheduling for Multicell Capacity Maximization" IEEE Trans. Wireless Commun., Vol. 7, No. 1, pp. 288-297, January 2008"; [4] L. Venturino, N. Prasad, and X. Wang, entitled "Coordinated Scheduling and Power Allocation In Downlink Multicell OFDMA Networks," IEEE Trans. Veh. Technol., Vol. 6, No. 58, pp. 2835-2848, July 2009; and [5] A. L. Stolyar and H. Viswanathan, entitled "Self-Organizing Dynamic Fractional Frequency Reuse For Best-Effort Traffic Through Distributed Intercell Coordination," in INFOCOM, April 2009.)

However, in practice, scheduling may happen on a different time scale than power control, thus, iteration between the power control and scheduling are not necessarily practical.

Thus, there is a need for alternative systems and methods for power control, and in particular, practically feasible methods for managing interference through power control, which provide low computational complexity and fast convergence.

SUMMARY OF INVENTION

The present invention seeks to eliminate, or at least mitigate, disadvantages of these known systems and methods, or at least provide an alternative.

Thus, aspects of the invention provide systems and methods, apparatus and software for managing interference through power control in wireless backhaul networks. In particular, methods for power control are provided which are based on a one-power-zone (OPZ) constraint, wherein the transmit frame structure for each hub comprises a plurality of zones, each RBM being scheduled on a different zone, and wherein the same power level is maintained across each of the plurality zones within a transmitted frame.

According to a first aspect of the invention, methods are provided based on a transmit frame structure for a wireless backhaul network comprising a plurality of hubs, each hub serving a plurality of remote backhaul modules (RBMs), wherein for each hub, the transmit frame structure comprises a plurality of zones, each RBM being scheduled on a different zone and wherein the same power level is maintained across each of the plurality of zones within a transmitted frame.

In each hub downlink transmitted frame, data belonging to different RBMs served by a specific hub are separated in different zones of the downlink frame. Thus, system performance is limited solely by interhub interference. Then, RBMs served within each downlink frame are further constrained to be at the same power level, which will be referred to as the one-power-zone constraint (OPZ).

Thus, instead of directly tackling the joint scheduling and power control problem, the systems and methods according to the present invention apply an extra constraint that the transmit signals for different RBMs, which are scheduled in different zones within each frame, must have the same transmit power level.

A key advantage of the OPZ constraint is the following. Under a class of scheduling policies for which the number of zones assigned to each RBM is fixed, the OPZ constraint decouples the power optimization problem from scheduling, thus allowing the design of power control methods to be independent of the scheduling policy, thereby greatly facilitating practical implementation. Further, the OPZ constraint allows the allocation of power on a per-frame basis, rather than on a per-zone basis, which significantly reduces the implementation complexity of the radio-frequency (RF) transmitter front-end.

Accordingly, methods are provided for power control in a wireless backhaul network comprising a plurality L of hubs, each hub serving a plurality K of remote backhaul modules (RBMs), wherein each hub uses a transmit frame structure comprising a plurality N of zones wherein the same power level is maintained across all N zones within a transmit frame, and wherein the number of zones assigned to each RBM is fixed.

In particular, one aspect of the invention provides a method for managing interference in a backhaul network, through power control comprising optimizing the downlink power based on maximizing the weighted-sum rate across the network subject to a practical OPZ constraint. Use of the OPZ constraint allows for power control to be determined independently of resource scheduling policy.

The step of updating the power level for each zone for every hub frame is based on weights $\lambda_{lk}$ and channel measurements $\lambda_{jlk}$, determining the appropriate power $P_l$ for every hub frame of the lth hub by steps comprising: maximizing a weighted sum rate across all hub-RBM links, using an iterative function evaluation approach or a Newton's method approach, and wherein the optimization is defined by:

$$\max \sum_{l,n} \lambda_{lk} r_{lk}$$

s.t. $0 \le P_l \le S^{max}$ where $$r_{lk} = \log\left(1 + \frac{P_l |h_{llk}|^2}{\Gamma\left(\sigma^2 + \sum_{j \ne l} P_j |h_{jlk}|^2\right)}\right)$$

where k=f(l,n) is the RBM scheduled at zone n of lth hub frame, $\Gamma$ is the SNR gap, $S^{max}$ is the maximum power constraint, $h_{jlk}$ is the channel between the jth hub and the kth RBM of the lth hub, and where the optimization is over the set of powers $P_l$.

The OPZ constraint also enables allocation of power on a per-hub basis, rather than on a per-zone basis, which further reduces the overall complexity. The step of updating may comprise updating the transmit power for each hub downlink and/or uplink. Updating is done after a change in channel or a change in weights $\lambda_{ij}$. The step of updating may be made choosing the best solution among a set of optima resulting from different starting points. The weights $\lambda_{ij}$ are set, for example, to be proportional to the rate constraints requirements of the system; to be proportional to the queue length of the data required for each RBM; or to be inversely proportional to the long term average rate of each RBM.

Practical methods according to several embodiments are presented, based on an iterative function evaluation approach, or alternatively an updated Newton's method based approach. The iterative function evaluation approach does not require step size choices, which are required by traditional optimization methods, such as Newton's method and steepest descent methods.

The use of the OPZ constraint in methods for interference management is also particularly applicable to systems that are physically limited to maintaining one power level across all zones of the downlink frame.

A method according to one embodiment comprises OPZ iterative function evaluation method (OPZ-IFEM) based on channel gains using the OPZ constraint and an iterative function evaluation method, e.g. as defined in equation 5.

A method according to another embodiment comprises OPZ-HSIFEM, based on channel gains using the OPZ constraint and a high SINR approximation iterative function evaluation method, for example, taking an approximation in the limit as SINR goes to infinity.

A method according to another embodiment comprises OPZ theta-SINR based on channel gains using the OPZ constraint and a theta-SINR approximation iterative function evaluation method taking a fixed value of SINR evaluated at maximum allowable power.

A method according to another embodiment comprises OPZ Average IFEM (OPZ-AVG-IFEM) based on channel gains using the OPZ constraint and theta-SINR approximation iterative function evaluation method by taking one representative value of the power calculated on a per-zone basis $P_n^l$ and wherein the value of the power $P_l$ is found using the average value of the resulting power value $P_n^l$ of SINR evaluated at maximum allowable power.

A method according to yet another embodiment comprises OPZ Newton's method-based approach, based on channel gains using the OPZ constraint and a Newton's method approach, e.g. as defined in equations 9 to 12.

Methods of these embodiments provide for distributed implementation across all hubs. Further, some methods, i.e. OPZ-HSIFEM and OPZ-theta-IFEM, allow for asynchronous implementation at each hub (i.e. where each hub can use possibly outdated information).

Accordingly, other aspects of the invention provide: apparatus in a backhaul network comprising processor means for implementing steps of the methods; a computer program product embodied in a transmission medium or storage medium for performing, in processor means of a backhaul network, steps of the methods; and a system in a wireless backhaul network comprising processor means for implementing the steps of the methods.

Thus, systems apparatus and methods of the present invention using the one-power-zone (OPZ) constraint, and scheduling policies using a fixed number of zones per RBM, provide for practically feasible power control for interference management. Practical embodiments of these methods are disclosed herein that provide lower computational complexity and fast convergence. Simulations demonstrate that the proposed methods provide a significant performance improvement as compared to conventional networks with a maximum power transmission strategy.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 4 shows a table that summarizes the system parameters of the wireless backhaul network, used to evaluate the performance of methods according to embodiments of the invention;

FIG. 5A is a table showing the simulated performance of various proposed methods, for different values of hub-to-hub distance d, wherein the hub-to-RBM distance is set to 0.15 km;

FIG. 5B is a table showing the simulated performance of various proposed methods, for both cell-edge and cell-center RBMs, wherein the hub-to-hub distance is set to 0.5 km;

FIG. 5C is a table showing the simulated performance of various proposed methods, for both cell-edge and cell-center RBMs, wherein the hub-to-hub distance is set to 1 km;

DETAILED DESCRIPTION OF EMBODIMENTS

Wireless Backhaul Network Architecture

Figure 1:
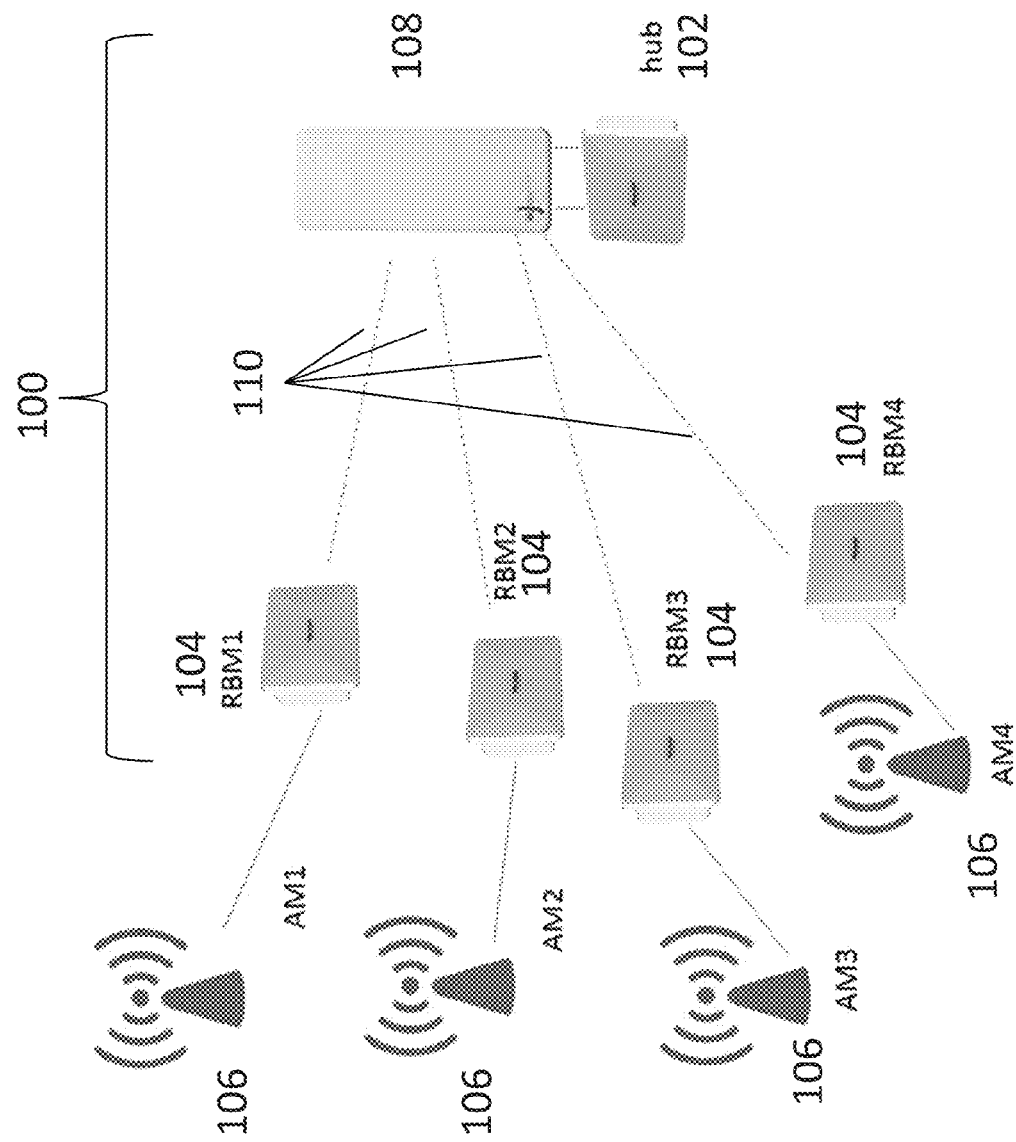
FIG. 1 shows a schematic diagram representing one node or cluster of a point-to-multipoint wireless backhaul network, comprising one hub serving a plurality of remote backhaul modules (RBMs)

FIG. 1 shows a schematic diagram representing an example of a node or cluster in a point-to-multipoint wireless backhaul network 100 comprising one hub module 102, serving four RBMs 104, by radio links 110, i.e. in this example four hub-RBM links 110. Each RBM 104 communicates with and is co-located with an access module (AM) 106 of an access network, such as a small cell-base station, using a wired connection, e.g. an Ethernet cable. The hub module 102 has a separate directional antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network.

Figure 2:
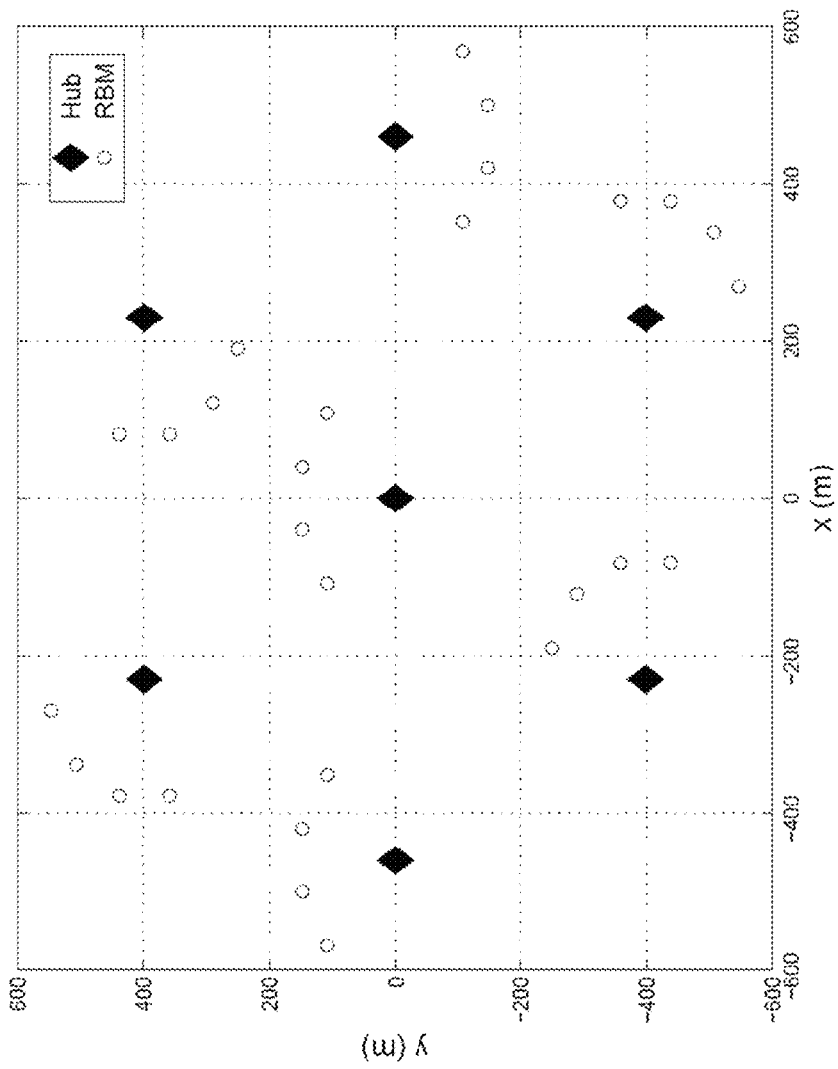
FIG. 2 shows a schematic diagram of a wireless backhaul network comprising seven nodes or hubs, wherein each hub serves four remote backhaul modules (RBMs)

Thus, an exemplary point-to-multipoint, Non Line of Sight (NLOS) wireless backhaul network 100 comprising a plurality of nodes or hubs 102, each serving a plurality of remote backhaul modules (RBMs) 104, is illustrated schematically in FIG. 2. In this example, the network comprises seven hubs, each serving four RBMs 104. Such a network may use a frequency reuse factor of one.

Problem Formulation

In general, the system model is that of a wireless backhaul network 100, comprising L hubs 102, each serving K RBMs 104. That is L=7 and K=4 for the network shown in FIG. 2. The transmitted frame of the $l^{th}$ hub is formed by K frame zones (along the time dimension), each allocated to one of the RBMs 104 served by the $l^{th}$ hub. That is, each RBM 104 served by a particular hub is scheduled to a different zone. The performance of the system is therefore limited by interhub interference only, and thus, there is no intrahub interference.

Further, it is assumed that the transmitted frames among the different hubs are aligned so that the signal on zone n at one particular hub interferes only with the same zone n in other hubs, and not with other zones. It is also assumed that the duration of the entire frame is within the channel coherence time so that the channel stays constant across the zones.

Let k=f(l,n) and k'=f(j,n) be the RBMs assigned to zone n of the transmitted frames of the $l^{th}$ hub and the $j^{th}$ hub respectively. The received signal at the $n^{th}$ zone of the received frame of the $k^{th}$ RBM of the $l^{th}$ hub becomes:

$$y_l^k = h_{llk} x_l^n + \sum_{j \neq l} h_{jlk} x_j^n + z_l^n \qquad (1)$$

where $x_l^n$ is a complex scalar denoting the information signal for the $k^{th}$ RBM of the $l^{th}$ hub, $h_{jlk}$ is the channel from the $jt^h$ hub to the $k^{th}$ RBM, and $z_l^n$ is the additive white Gaussian noise with variance $\sigma^2/2$ on each of its real and imaginary components.

Thus, the classical approach to joint scheduling and power allocation can be formulated as an optimization problem based on maximizing the following weighted sum-rate over both the power $P_l^n$ of every hub l at every zone n, and the RBM-to-zone scheduling policy function k=f(l,n):

$$\max \sum_{l,k} \lambda_{lk} r_{lk} \qquad (2)$$

s.t. $0 \leq P_l^n \leq S^{max}$ $k = f(l, n)$ where $$r_{lk} = \log\left(1 + \frac{P_l^n |h_{llk}|^2}{\Gamma\left(\sigma^2 + \sum_{j \neq l} P_j^n |h_{jlk}|^2\right)}\right)$$

where $\lambda_{lk}$ are weights, $\Gamma$ denotes the SNR gap, and $S^{max}$ is the maximum power constraint imposed on each hub in each zone.

The above problem is a mixed discrete and continuous optimization problem, whose optimal solution may require a combinatorial search of exponential complexity. The existing iterative approach referenced in the background section (e.g. [1] Dahrouj et al.) is unsatisfactory for two reasons. First, scheduling and power control, typically, need to be done on different time scales. Scheduling decisions are made with network considerations (e.g., the queue length of each user, the latency and delay requirements, etc.), while power control needs to be done at the time scale of the channel variations. Second, the iterative approach may take many steps to converge; its complexity remains uncharacterized.

Figure 3:
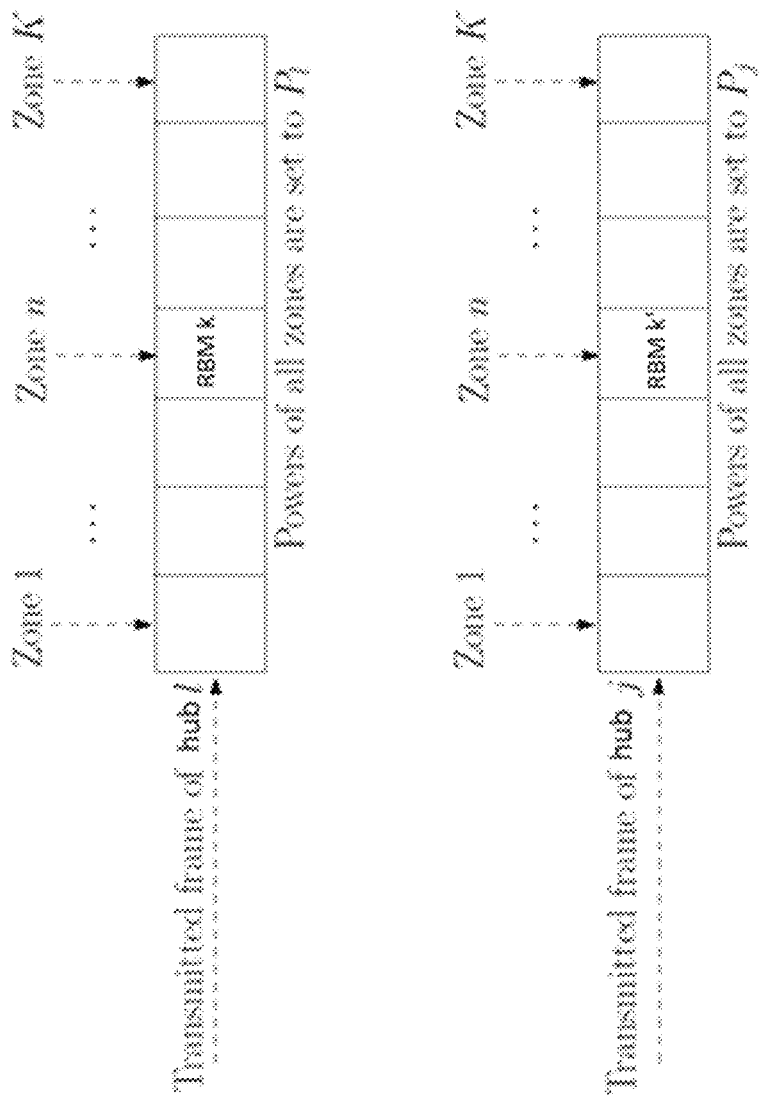
FIG. 3 shows schematically the transmit frame structure for a one-power-zone allocation scheme for the transmit frames of the $l^{th}$ and $j^{th}$ hubs.

With these considerations in mind, a novel approach is proposed, in which the same power level is maintained across all zones, i.e. setting $P_l^n = P_l \forall n=1, \ldots K$ within each frame. In this application, this is called the one-power-zone (OPZ) constraint. This power allocation scheme is illustrated schematically in FIG. 3, which shows the structure of the transmit frames for the $l^{th}$ and $j^{th}$ hubs. Each transmit frame of each hub comprises a plurality of N zones (along the time dimension). Note that different powers $P_l$ and $P_j$ may be used for each different hub or across different frames, to adapt to a particular channel realization.

For any RBM-to-zone scheduling function $k=f(l,n)$, the instantaneous rate of the $k^{th}$ RBM of the $l^{th}$ hub scheduled at $n^{th}$ zone becomes:

$$r_{lk} = \log\left(1 + \frac{P_l|h_{llk}|^2}{\Gamma\left(\sigma^2 + \sum_{j \neq l} P_j|h_{jlk}|^2\right)}\right) \quad (3)$$

which is, in fact, independent of the scheduling scheme. Consequently, as long as the scheduling policy assigns a fixed number of zones to each RBM, the problem no longer depends on exactly which zones each RBM is being scheduled in. Under this assumption, the OPZ constraint therefore decouples the power control and scheduling, and reduces the joint problem. The OPZ constraint also allows for optimization of the power on a per-hub basis rather than on a per-zone basis, which further reduces the overall complexity. In addition, the OPZ constraint is particularly viable for RF platforms that are physically limited to having the same power level across the zones in any single frame.

By imposing the OPZ constraint, the scheduling constraint $k=f(l,n)$ can be dropped. The OPZ power control problem becomes:

$$\max \sum_{l,n} \lambda_{lk} r_{lk} \quad (4)$$

s.t. $0 \leq P_l \leq S^{max}$ where $$r_{lk} = \log\left(1 + \frac{P_l|h_{llk}|^2}{\Gamma\left(\sigma^2 + \sum_{j \neq l} P_j|h_{jlk}|^2\right)}\right)$$

where the maximization is over the set of powers $P_l$.

This problem is a difficult non-convex optimization problem for which only local optimality can be assured.

Thus, practical methods according to embodiments of the present invention are disclosed herein to solve this optimization problem based on a weighted sum-rate optimization with the OPZ constraint using an iterative function approach. The derivation of these methods is described in more detail in [6] an article entitled "Interference Mitigation Via Power Control Under the One-Power-Zone Constraint", by the present inventors, Dahrouj et. al. (IEEE Global Telecommun. Conf. (Globecom), Anaheim, Calif., USA, December 2012), which is incorporated herein by reference, in its entirety. Some of the methods are based on an iterative function evaluation approach. Also disclosed is a method based on the OPZ constraint using a Newton's method approach. The derivation of these methods is based on specific manipulation of the first order condition of the optimization problem. Using an iterative function evaluation approach, the proposed methods do not require step-size choices as is required in traditional optimization methods. The novel methods have low computational complexity, and can be implemented in a distributed fashion across the network. In each of these methods, the step of updating is made after a change in channel or a change in weights $\lambda_{ij}$. The step of updating may be made by choosing the best solution among a set of optima resulting from different starting points.

Some of the proposed methods can be implemented asynchronously at each hub, (i.e. where each hub can use possibly outdated information) which is advantageous for practical utilization.

OPZ Iterative Function Evaluation Method (OPZ-IFEM)

The OPZ iterative function evaluation method (OPZ-IFEM) solves the problem as follows. Compute all the terms on the right-hand-side of the following equation using the current power allocation at time t, and update the new power at time t+1:

$$P_l(t+1) = \left[\frac{\sum_K \lambda_{lk}\left(\frac{SINR_l^k(t)}{1+SINR_l^k(t)}\right)}{\sum_{j \neq l}\sum_{k'} \frac{\lambda_{jk'}|h_{ljk'}|^2}{\sigma^2 + \sum_{i \neq j} P_i(t)|h_{ijk'}|^2} \frac{SINR_j^{k'}(t)}{1+SINR_j^{k'}(t)}}\right]_0^{S^{max}} \quad (5)$$

where the maximum power $S^{max}$ is taken into consideration and where SINR is defined as:

$$SINR_l^k = \frac{P_l|h_{llk}|^2}{\Gamma\left(\sigma^2 + \sum_{j \neq l} P_j|h_{jlk}|^2\right)}$$

OPZ High-SINR IFEM (OPZ-HSIFEM)

OPZ high-SINR IFEM (OPZ-HSIFEM) solves the problem as follows. Compute all the terms on the right-hand-side of the following equation using the current power allocation at time t, and update the new power at time t+1:

$$P_l(t+1) = \left[\frac{\sum_k \lambda_{lk}}{\sum_{j \neq l}\sum_{k'} \frac{\lambda_{jk'}|h_{ljk'}|^2}{\sigma^2 + \sum_{i \neq j} P_i(t)|h_{ijk'}|^2}}\right]_0^{S^{max}} \quad (6)$$

OPZ Theta-IFEM (OPZ-theta-IFEM)

OPZ theta-IFEM (OPZ-theta-IFEM) solves the problem as follows. Compute all the terms on the right-hand-side of the following equation using the current power allocation at time t, and update the new power at time t+1:

$$P_l(t+1) = \left[\frac{\sum_k \lambda_{lk} \theta_l^k}{\sum_{j \neq l} \sum_{k'} \frac{\lambda_{jk'}|h_{ljk'}|^2}{\sigma^2 + \sum_{i \neq j} P_i(t)|h_{ijk'}|^2} \theta_j^{k'}}\right]_0^{S^{max}} \quad (7)$$

where $$\theta_l^k = \frac{S\tilde{I}NR_l^k}{1 + S\tilde{I}NR_l^k}$$

and where $$S\tilde{I}NR_l^k = \frac{S^{max}|h_{llk}|^2}{\Gamma\left(\sigma^2 + \sum_{j \neq l} S^{max}|h_{jlk}|^2\right)}$$

OPZ Average-IFEM (OPZ-AVG-IFEM)

OPZ Average-IFEM (OPZ-AVG-IFEM) solves the problem as follows. Compute all the terms on the right-hand-side of the following equation using the current power allocation at time t, and update the new power at time t+1:

$$P_l^n(t+1) = \left[\frac{\lambda_{lk} \frac{SINR_l^k(t)}{1 + SINR_l^k(t)}}{\sum_{j \neq l} \lambda_{jk'} \frac{|h_{ljk'}|^2}{\sigma^2 + \sum_{i \neq j} P_i^n(t)|h_{ijk'}|^2} \frac{SINR_j^{k'}(t)}{1 + SINR_j^{k'}(t)}}\right]_0^{S^{max}} \quad (8)$$

Then, set the common value of the power across each frame to the average value of the powers $P_l^n$ for n=1, ..., K.

OPZ-Newton's Method (OPZ-NM)

Also proposed is a method according to yet another embodiment, based on Newton's method approach. This method, called OPZ-Newton's method (OPZ-NM), is derived based on dividing the gradient element of the objective function by the diagonal Hessian elements, and then using the results to appropriately scale the update direction. The method subsequently iterates between finding the power allocation among all the hubs as follows. First, find the gradient elements as:

$$\frac{\partial R}{\partial P_l} = \sum_n \frac{\lambda_{lk}}{P_l}\left(\frac{SINR_l^k}{1 + SINR_l^k}\right) - \quad (9)$$

$$\sum_{j \neq l} \sum_n \frac{\lambda_{jk'}|h_{ljk'}|^2}{\sigma^2 + \sum_{i \neq j} P_i(t)|h_{ijk'}|^2} \frac{SINR_j^{k'}}{1 + SINR_j^{k'}}$$

where $k = f(l, n)$ and $k' = f(j, n)$.

Then, find the diagonal Hessian elements using the following approximation:

$$\frac{\partial^2 R}{\partial P_l^2} \approx \sum_n \frac{-\lambda_{lk}}{(P_l)^2}\left(1 + \frac{1}{SINR_l^k}\right)^{-2} \quad (10)$$

At time t, the step-update is defined as:

$$\Delta P_l(t) = \frac{\frac{\partial R}{\partial P_l}(t)}{\left|\frac{\partial^2 R}{\partial P_l^2}(t)\right|} \quad (11)$$

The power-update equation for every hub at time t+1 then becomes:

$$P_l(t+1) = [P_l(t) + \mu \Delta P_l(t)]_0^{S^{max}} \quad (12)$$

where μ is the step-size, which is set to one or chosen to guarantee the algorithm convergence.

Unlike the iterative function evaluation based methods (i.e. OPZ-IFEM, OPZ-theta-IFEM, OPZ-HSIFEM, and OPZ-AVG-IFEM), OPZ-NM requires a step-size for convergence; however, OPZ-NM shows a faster convergence behavior than the iterative function evaluation based methods.

Simulations

Simulations were made to compare the performance of these methods with the more computationally-complex Full IFEM method disclosed in [1] Dahrouj et al.

FIG. 4 shows a table that summarizes the network parameters used for the simulations. The network comprises 7 hubs, with 4 RBMs per hub, as shown schematically in FIG. 2, with maximal frequency reuse (frequency reuse of one). Each transmit frame comprises 4 zones. Scheduling comprises round-robin scheduling. The channel parameters were chosen to correspond to a typical wireless backhaul network deployment. The hub-to-hub distance is $d_1$. The distance between a hub and each RBM served by the hub is $d_2$. For these comparative simulations, the weights $\lambda_{lk}$ were set to 1.

Simulation results for different topologies were obtained using different values of $d_1$ and $d_2$. FIG. 5A is a table that compares the sum-rate performance (bps/Hz) of each method for both small-cell (hub-to-hub distance $d_1$=0.5 km) and large-cell (hub-to-hub distance $d_1$=1.0 km) networks.

FIG. 5B is table that compares the sum-rate performance (bps/Hz) of each method for cell-edge ($d_2$=333 m) and cell-centre ($d_2$=125 m) networks, for small cells with a hub-to-hub distance of 0.5 km.

FIG. 5C is table that compares the sum-rate performance (bps/Hz) of each method for cell-edge ($d_2$=667 m) and cell-centre ($d_2$=250 m) networks, for large cells with a hub-to-hub distance of 1.0 km.

As expected, the methods disclosed herein provide a better performance gain in small cells, since the interference mitigation technique is particularly effective in a high interference regime. Likewise, the performance gain is higher for cell-edge RBMs, as shown in FIG. 5B and FIG. 5C, where the interference is typically high.

FIG. 5A, FIG. 5B and FIG. 5C also show how full-IFEM (i.e. the method which does not take the OPZ constraint into consideration and has a larger search space for optimization) has a performance gain which is more pronounced than OPZ-IFEM gain. This is due to the fact that OPZ-IFEM solves the OPZ constrained optimization, which places tighter bounds on the search space of the optimal values, while full-IFEM does not satisfy the OPZ requirements.

Figure 6:
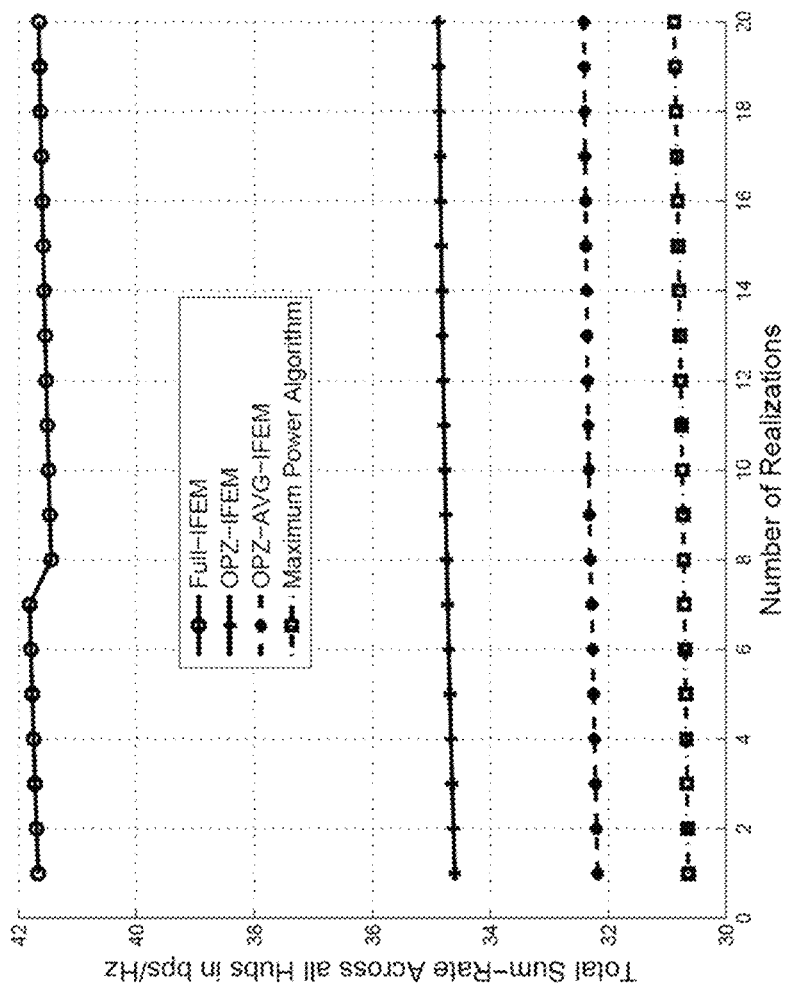
FIG. 6 plots the total sum-rate for different channel realizations to compare the performance of methods of the different embodiments.

FIG. 6 shows plots of the sum-rate across all hubs for different realizations of the channel, so as to compare the performance of the proposed methods. FIG. 6 shows the performance improvement of the OPZ-IFEM as compared to a maximum power transmission strategy for all channel realizations. It is apparent that full-IFEM, which relaxes the OPZ constraints, outperforms OPZ-IFEM, which solves the OPZ constrained optimization, while full-IFEM does not. OPZ-IFEM, however, always outperforms the suboptimal solution OPZ-AVG-IFEM, which in turn shows a better performance than maximum power transmission strategy.

Figure 7:
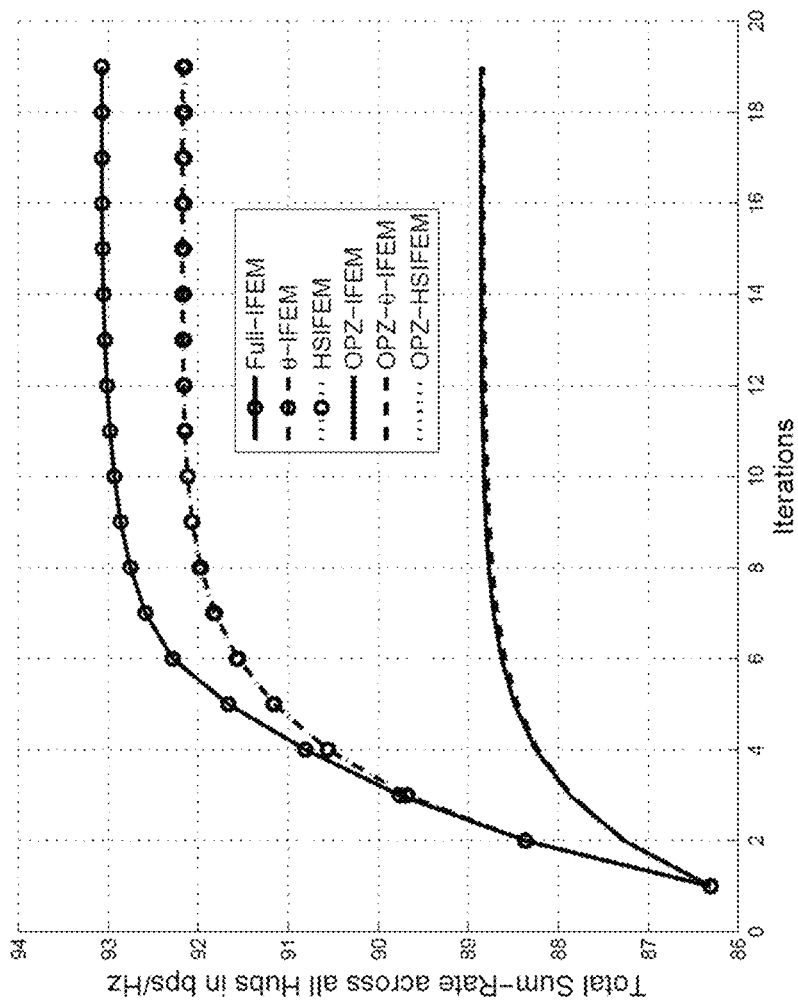
FIG. 7 plots the total sum-rate versus the number of iterations to show the convergence speed of the iterative function evaluation based methods for high SINR regime.
Figure 8:
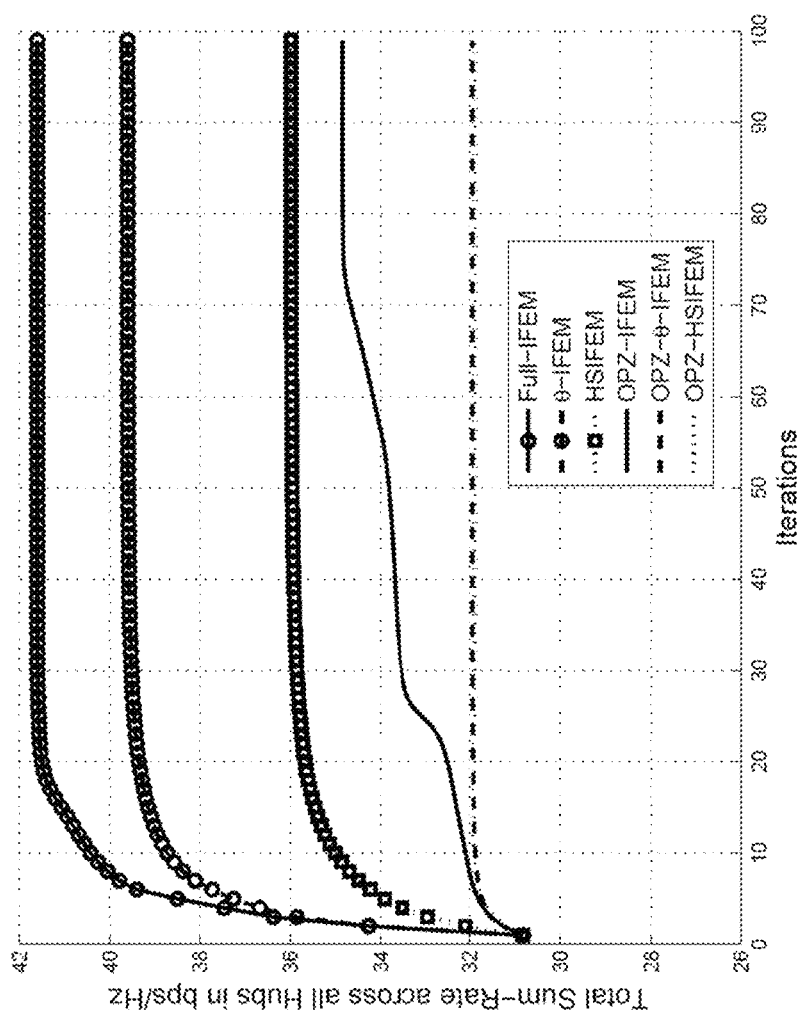
FIG. 8 plots the total sum-rate versus the number of iterations to show the convergence speed of the iterative function evaluation methods for low SINR regime.

To compare the convergence behavior of the proposed methods, plots of the sum-rate across all hubs versus the number of iterations are shown in FIG. 7 and FIG. 8. FIG. 7 illustrates a high SINR case where the performance of OPZ-theta-IFEM and OPZ-HSIFEM is similar to the performance of OPZ-IFEM, since the simplifications used in deriving OPZ-theta-IFEM and OPZ-HSIFEM best suit the high SINR scenarios. OPZ-theta-IFEM, OPZ-HSIFEM, and OPZ-IFEM show a faster convergence behavior as compared to the non-constrained methods, i.e. theta-IFEM, HSIFEM, and Full-IFEM which are proposed in [1] and do not solve the OPZ problem. However, as shown in a similar plot for the low SINR case illustrated in FIG. 8, the simplifications used in deriving OPZ-theta-IFEM and OPZ-HSIFEM bring in a larger penalty. Nevertheless, both OPZ-theta-IFEM and OPZ-HSIFEM show the fastest convergence behavior as compared to all other methods. OPZ-IFEM, in this situation, shows a remarkable convergence behavior. Its convergence curve takes up a series of steps before landing and converging to its local optimal solution, and eventually outperforming both OPZ-theta-IFEM and OPZ-HSIFEM.

Figure 9:
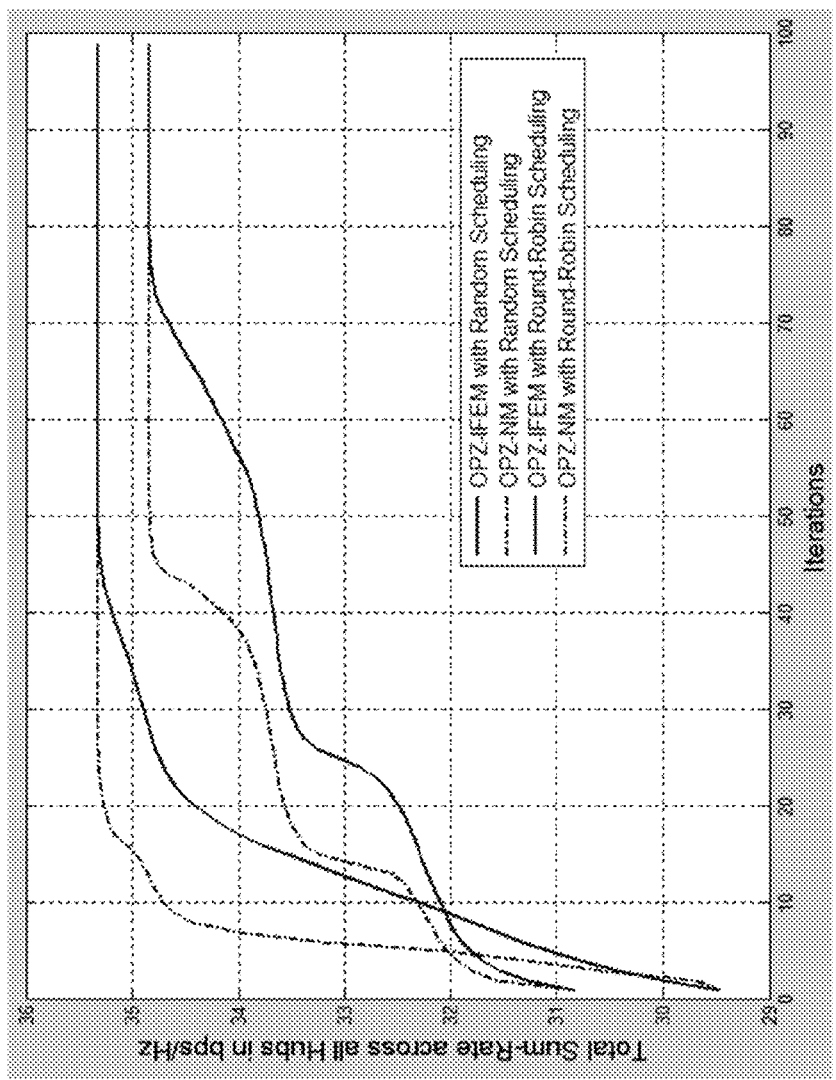
FIG. 9 plots the total sum-rate versus the number of iterations to show the convergence speed of the method based on the updated Newton's method approach.

Finally, to illustrate the convergence behavior of OPZ-NM, a plot of the sum-rate across all hubs versus the number of iterations is shown in FIG. 9. As expected, OPZ-NM, which is a function of the both the first order and second order derivatives of the objective function, has a faster convergence rate than OPZ-IFEM, which is simply based on the first order optimality conditions. OPZ-IFEM, on the other hand, does not depend on a specific step size choice, as OPZ-NM does.

INDUSTRIAL APPLICABILITY

The performance of next generation backhaul networks is strongly dependent on development of feasible interference mitigation techniques, specifically those developed to achieve higher data capacity and increase system reliability. Practical methods are disclosed herein, based on a one-power-zone (OPZ) constraint. The OPZ constraint removes the coupling between the power control and scheduling problems in the context of interference management. Thus, efficient power control methods can be developed independently of the scheduling policy. The proposed methods have low computational complexity and can be implemented in a distributed fashion across all hubs. Some of these methods can be implemented asynchronously. Simulations demonstrate that the proposed methods provide significant performance improvement relative to conventional backhaul networks that use maximum power transmission.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for managing interference in a wireless backhaul network comprising a plurality (L) of hubs, each serving a plurality (K) of remote backhaul modules (RBM), the method comprising:
    for each hub, maintaining a one-power-zone (OPZ) constraint, comprising
        for each transmitted frame comprising a plurality of zones, wherein the number of zones assigned to each RBMs is fixed,
        scheduling each RBM on a different zone or a different set of zones,
        maintaining the same power level across each of the plurality zones within a transmitted frame,
    updating the power level for each zone for every hub frame based on weights $\lambda_{lk}$ and channel measurements $h_{jlk}$, determining the appropriate power $P_l$ for every hub frame of the lth hub by steps comprising:
        maximizing a weighted sum rate across all hub-RBM links, using an iterative function evaluation approach or a Newton's method approach, and wherein the optimization is defined by:

$$\max \sum_{l,n} \lambda_{lk} r_{lk}$$

$$\text{s.t.} \quad 0 \leq P_l \leq S^{max}$$

where $$r_{lk} = \log\left(1 + \frac{P_l |h_{llk}|^2}{\Gamma\left(\sigma^2 + \sum_{j \neq l} P_j |h_{jlk}|^2\right)}\right)$$

where k=f(l,n) is the RBM scheduled at zone n of lth hub frame, $\Gamma$ is the SNR gap, $S^{max}$ is the maximum power constraint, $h_{jlk}$ is the channel between the jth hub and the kth RBM of the lth hub, and where the optimization is over the set of powers $P_l$.

2. A method according to of claim 1 wherein an objective function is selected to provide an optimization across a set of zones, or alternatively, across all zones for each frame.

3. A method according to 1 wherein the step of updating the power level comprises updating the transmit power for each hub downlink and/or uplink.

4. A method according to claim 1 wherein the step of updating is made after any one of: a change in channel; a change in weights $\lambda_{ij}$; and choosing the best solution among a set of optima resulting from different starting points.

5. A method according to claim 1 wherein the weights $\lambda_{ij}$ are set:
    a) to be proportional to the rate constraints requirements of the system; or
    b) to be proportional to the queue length of the data required for each RBM; or
    c) to be inversely proportional to the long term average rate of each RBM.

6. A method according to claim 5, wherein power allocation is based on channel gains for each hub-RBM link using the one-power-zone-constraint and an iterative function evaluation method (OPZ-IFEM).

7. The method of claim 6 (OPZ-IFEM), wherein the value of the power $P_l$ for each hub is updated from time t to t+1 is found iteratively using the following update function:

$$P_l(t+1) = \left[\frac{\sum_K \lambda_{lk}\left(\frac{SINR_l^k(t)}{1+SINR_l^k(t)}\right)}{\sum_{j\neq l}\sum_{k'}\frac{\lambda_{jk'}|h_{ljk'}|^2}{\sigma^2 + \sum_{i\neq j}P_i(t)|h_{ijk'}|^2}\frac{SINR_j^{k'}(t)}{1+SINR_j^{k'}(t)}}\right]_0^{S^{max}}$$

where $$SINR_l^k = \frac{P_l|h_{llk}|^2}{\Gamma\left(\sigma^2 + \sum_{j\neq l}P_j|h_{jlk}|^2\right)}.$$

8. A method of according to claim 5, wherein power allocation is based on the channel gains, using the one-power-zone-constraint and a high SINR iterative function evaluation method (OPZ-HSIFEM) with a high SINR approximation.

9. The method of claim 8 (OPZ-HSIFEM), wherein the power of each hub $P_l$ is found by taking the limit as SINR goes to infinity, and wherein the value of the power $P_l$ is found iteratively using the following function:

$$P_l(t+1) = \left[\frac{\sum_k \lambda_{lk}}{\sum_{j\neq l}\sum_{k'}\frac{\lambda_{jk'}|h_{ljk'}|^2}{\sigma^2 + \sum_{i\neq j}P_i(t)|h_{ijk'}|^2}}\right]_0^{S^{max}}.$$

10. A method according to claim 5, wherein power allocation is based on the channel gains, using the one-power-zone-constraint and a theta iterative function evaluation method (OPZ-theta-IFEM) using a fixed value of SINR.

11. The method of claim 10 (OPZ-theta-IFEM), wherein the power of each hub $P_l$ is found by replacing the SINR term by a fixed value of SINR evaluated at maximum allowable power, and wherein the value of the power $P_l$ is found iteratively using the following function:

$$P_l(t+1) = \left[\frac{\sum_k \lambda_{lk}\theta_l^k}{\sum_{j\neq l}\sum_{k'}\frac{\lambda_{jk'}|h_{ljk'}|^2}{\sigma^2 + \sum_{i\neq j}P_i(t)|h_{ijk'}|^2}\theta_j^{k'}}\right]_0^{S^{max}}$$

where $$\theta_l^k = \frac{S\tilde{I}NR_l^k}{1+S\tilde{I}NR_l^k}$$

and $$S\tilde{I}NR_l^k = \frac{S^{max}|h_{llk}|^2}{\Gamma\left(\sigma^2 + \sum_{j\neq l}S^{max}|h_{jlk}|^2\right)}.$$

12. A method according to claim 5, wherein power allocation is based on the channel gains using the one-power-zone-constraint and an average iterative function evaluation method (OPZ-AVG-IFEM).

13. The method of claim 12 (OPZ-AVG-IFEM), wherein the power of each hub $P_l$ is found by taking one representative value of the power calculated on a per-zone basis $P_l^n$, wherein the value of the power $P_l^n$ is found iteratively using the following iterative function:

$$P_l^n(t+1) = \left[\frac{\lambda_{lk}\frac{SINR_l^k(t)}{1+SINR_l^k(t)}}{\sum_{j\neq l}\lambda_{jk'}\frac{|h_{ljk'}|^2}{\sigma^2 + \sum_{i\neq j}P_i^n(t)|h_{ijk'}|^2}\frac{SINR_j^{k'}(t)}{1+SINR_j^{k'}(t)}}\right]_0^{S^{max}}$$

and wherein the value of the power $P_l$ is found using the average value of the resulting power $P_l^n$.

14. A method according to claim 5, wherein power allocation is based on the channel gains using the one-power-zone-constraint and a Newton's method approach (OPZ-NM).

15. The method of claim 14 (OPZ-NM), wherein the power of each hub $P_l$ is found using an appropriate update of the power $P_l$ based on a Newton's method approach wherein the value of the power $P_l$ is found iteratively using the following function:

$$P_l(t+1) = [P_l(t) + \mu \Delta P_l(t)]_0^{S^{max}},$$

where $\mu$ is the step size, set to one or chosen to guarantee the algorithm convergence, and where $\Delta P_l(t)$ is found as the ratio of the corresponding gradient and hessian elements of the objective function:

$$\Delta P_l(t) = \frac{\frac{\partial R}{\partial P_l}(t)}{\left|\frac{\partial^2 R}{\partial P_l^2}(t)\right|}, \text{ where}$$

$$\frac{\partial R}{\partial P_l} = \sum_n \frac{\lambda_{lk}}{P_l}\left(\frac{SINR_l^k}{1+SINR_l^k}\right) - \sum_{j\neq l}\sum_n \frac{\lambda_{jk'}|h_{ljk'}|^2}{\sigma^2 + \sum_{i\neq j}P_i(t)|h_{ijk'}|^2}\frac{SINR_j^{k'}}{1+SINR_j^{k'}}$$

and where $$\frac{\partial^2 R}{\partial P_l^2} \approx \sum_n \frac{-\lambda_{lk}}{(P_l)^2}\left(1 + \frac{1}{SINR_l^k}\right)^{-2}$$

where k=f(l,n) and k'=f(j,n) are the RBMs served by hubs l and j in zone n, respectively.

16. The method of claim 1, comprising any one of OPZ-IFEM, OPZ-HSIFEM, OPZ-theta-IFEM, OPZ-AVG-IFEM, and OPZ NM, wherein the steps of the method are implemented in a distributed manner across all hubs.

17. The method of claim 16, comprising one of OPZ-HSIFEM and OPZ-theta-IFEM, wherein the steps of the method are implemented in an asynchronous manner at every hub.

18. Apparatus in a backhaul network comprising processor means for implementing the methods steps of claim 1, comprising one of OPZ-IFEM, OPZ-HSIFEM, OPZ-theta-IFEM, and OPZ-AVG-IFEM, and OPZ-NM.

19. A computer program product embodied in a non-transitory transmission medium or non-transitory storage for performing, in processor means of a backhaul network, the method steps of claim 1, comprising one of OPZ-IFEM, OPZ-HSIFEM, OPZ-theta-IFEM, and OPZ-AVG-IFEM, and OPZ-NM.

20. A system in a wireless backhaul network comprising processor means for implementing the method steps of claim 1, comprising one of OPZ-IFEM, OPZ-HSIFEM, OPZ-theta-IFEM, and OPZ-AVG-IFEM, and OPZ-NM.

* * * * *